Patented Nov. 8, 1938

2,136,349

UNITED STATES PATENT OFFICE 2,136,349

STABILIZING VINYLIDENE CHLORIDE

Ralph M. Wiley, Midland, Mich., assignor to The Dow Chemical Company, Midland, Mich., a corporation of Michigan No Drawing. Application March 23, 1938, Serial No. 197,617

7 Claims. (Cl. 23—250)

This invention relates to the art of stabilizing vinylidene chloride, $H_2C=CCl_2$, and to improved compositions thereby obtained.

When vinylidene chloride is exposed to the action of air, light, elevated temperatures, or to any of several catalytic agents, it polymerizes readily forming resinous products, the properties of which will depend to a great extent upon the conditions of polymerization. This tendency to polymerize is so persistent that it has become necessary to provide a means by which vinylidene chloride may be maintained in the monomeric form at least temporarily, so that it can be stored for a period of time following its preparation and prior to its use in chemical reactions or in resin formation. It is accordingly among the objects of the present invention to provide a means whereby vinylidene chloride may be inhibited against polymerization. A further object is to provide a relatively stable monomeric vinylidene chloride. Another object is to provide a stabilized vinylidene chloride composition from which the stabilizing agent can be readily removed when desired.

I have discovered that vinylidene chloride can be inhibited against polymerization by adding thereto relatively small quantities of certain inorganic compounds, or a combination thereof, and further that the stabilizing agents can again be readily separated from the vinylidene chloride to render the same capable of polymerization. Among the various inorganic materials which I have found to be effective are inorganic chlorides which liberate hydrogen chloride on reaction with water, such as the chlorides of sulphur, antimony, arsenic, platinum, and titanium, and thionyl chloride. All of the above-mentioned compounds are readily miscible with or soluble in vinylidene chloride.

The concentration of stabilizing agents to be employed in monomeric vinylidene chloride may be varied depending upon the length of time which it is desired to stabilize the compound, upon the effectiveness of the particular agent employed, and upon whether any polymerization catalysts have previously been added to the vinylidene chloride. For most purposes a freshly distilled vinylidene chloride will be found to remain in monomeric form if there is added thereto from about 0.2 to about 2.0 per cent of one of the aforementioned stabilizing agents. In no case has it been found necessary to employ greater amounts of inhibitor than about 10 per cent of the weight of vinylidene chloride.

In a preferred method of carrying out my invention, a small amount of one of the stabilizing or inhibiting agents previously mentioned, suitably about 0.5 per cent based on the weight of vinylidene chloride, is added to freshly distilled monomeric vinylidene chloride, which may then be stored. When it is desired to utilize the stabilized vinylidene chloride in polymerization processes, the stabilizing agents may be readily and completely removed from the solution by shaking the mixture with dilute aqueous alkali. Another means of separating the inhibitor from the vinylidene chloride consists in distilling the latter material from the less volatile inhibitor. Owing to the volatility of some of the inhibiting or stabilizing agents mentioned above, this process is not quite as satisfactory as the alkaline extraction method. After the vinylidene chloride has been separated from the stabilizer it is found to polymerize readily when exposed to usual polymerizing conditions.

The following examples serve to illustrate the practice of my invention:

Example 1

To two 30-gram mixtures containing 30 per cent vinyl chloride and 70 per cent vinylidene chloride, by weight, were added 0.15 grams each of benzoyl peroxide, chloroacetyl chloride, and tetraethyl lead (a known catalyst mixture for the polymerization of vinylidene chloride). To one of the samples was added 1 milliliter of red sulphur chloride. No evidence of polymerization could be detected after exposure of the sample to a temperature of 40° C. for 8 days. The blank run to which no inhibitor had been added was substantially all polymerized in this period of time.

Example 2

Under conditions similar to those described in the preceding example, 0.15 gram of thionyl chloride was found to have prevented polymerization of vinylidene chloride when tested at the end of 8 days.

Example 3

When antimony pentachloride was substituted for the thionyl chloride of the preceding example, it was found to inhibit vinylidene chloride against polymerization even in the presence of such active catalytic agents as those mentioned in Example 1.

Other sulphur chlorides, antimony trichloride, and the chlorides of arsenic, platinum, and titanium, when added to monomeric vinylidene chloride, were all found to inhibit polymerization thereof. Any of the chlorides of the foregoing elements may be employed provided they have the property previously mentioned, namely, that of liberating hydrogen chloride on reaction with water.

This application is a continuation-in-part of my co-pending application Serial No. 151,721, filed July 2, 1937.

Other modes of applying the principle of my invention may be employed instead of those explained, change being made as regards the materials employed, provided the steps or materials stated in the following claims be thereby carried out or obtained.

I therefore particularly point out and distinctly claim as my invention:

1. A composition of matter comprising monomeric vinylidene chloride and sufficient of a material selected from the group consisting of thionyl chloride and the chlorides of sulphur, antimony, arsenic, platinum, and titanium which liberate hydrogen chloride on reaction with water to impart stability to the said vinylidene chloride.

2. A composition of matter comprising monomeric vinylidene chloride and between about 0.2 and about 10 per cent of a material selected from the group consisting of thionyl chloride and the chlorides of sulphur, antimony, arsenic, platinum, and titanium which liberate hydrogen chloride on reaction with water.

3. A composition of matter comprising monomeric vinylidene chloride and between about 0.2 and about 10 per cent of a chloride of sulphur.

4. A composition of matter comprising monomeric vinylidene chloride and between about 0.2 and about 10 per cent of red sulphur chloride.

5. A composition of matter comprising monomeric vinylidene chloride and between about 0.2 and about 10 per cent of an antimony chloride capable of liberating hydrogen chloride on reaction with water.

6. A composition of matter comprising monomeric vinylidene chloride and between about 0.2 and about 10 per cent of antimony pentachloride.

7. A composition of matter comprising monomeric vinylidene chloride and between about 0.2 and about 10 per cent of thionyl chloride.

RALPH M. WILEY.